United States Patent [19]

Walmsley

[11] Patent Number: 4,822,203

[45] Date of Patent: Apr. 18, 1989

[54] CLAMPS AND CONNECTORS

[75] Inventor: Owen Walmsley, Chorley, England

[73] Assignee: Robert Emmett, Lancaster, England

[21] Appl. No.: 30,581

[22] Filed: Mar. 27, 1987

[30] Foreign Application Priority Data

Apr. 2, 1986 [GB] United Kingdom ............... 8608073

[51] Int. Cl.$^4$ .............................................. F16B 2/02
[52] U.S. Cl. .................................. 403/314; 403/337; 403/328; 285/412; 285/368
[58] Field of Search ............... 285/414, 405, 412, 104, 285/105, 368, 363, 382, 317; 403/314, 328, 335, 337, 282

[56] References Cited

U.S. PATENT DOCUMENTS

| 2,182,797 | 12/1939 | Dillon | 285/104 X |
|---|---|---|---|
| 2,226,304 | 12/1940 | Dillon | 285/105 X |
| 2,283,975 | 5/1942 | Dillon . | |
| 332,470,256 | 5/1949 | McIlroy . | |
| 2,639,931 | 5/1953 | Kandle | 403/328 X |
| 2,747,898 | 5/1956 | Wiltse | 285/414 X |
| 2,838,266 | 6/1958 | Rees . | |
| 3,245,694 | 4/1966 | Parker . | |
| 3,653,688 | 4/1972 | Sakakibara | 285/105 |
| 3,966,234 | 6/1976 | Sundholm | 285/368 X |
| 4,488,743 | 12/1984 | Schulke | 285/368 |

FOREIGN PATENT DOCUMENTS

| 952307 | 11/1956 | Denmark . |
|---|---|---|
| 2325574 | 11/1974 | Denmark . |
| 2447088 | 4/1975 | Denmark . |
| 216890 | 9/1941 | Switzerland . |
| 2146091 | of 0000 | United Kingdom . |
| 2155577 | of 0000 | United Kingdom . |
| 456467 | 11/1936 | United Kingdom . |
| 569981 | 6/1945 | United Kingdom . |
| 651556 | 4/1951 | United Kingdom . |
| 723281 | 2/1955 | United Kingdom . |
| 731884 | 6/1955 | United Kingdom . |
| 877279 | 9/1961 | United Kingdom . |
| 1478861 | 7/1977 | United Kingdom . |
| 2074684A | 11/1981 | United Kingdom . |
| 2089918A | 6/1982 | United Kingdom . |
| 2096723A | 10/1982 | United Kingdom . |
| 2099946A | 12/1982 | United Kingdom . |

Primary Examiner—Andrew V. Kundrat
Attorney, Agent, or Firm—William R. Hinds

[57] ABSTRACT

A connector for pipes has two tubular parts each with three angularly spaced inclined bores intersecting the inner surface of the parts and containing balls engaging inclined wedge surfaces and biassed axially by respective springs. In use the parts are drawn together by rotating nuts on studs and the balls grip the pipes and compress a seal, the balls gouging into the pipes. The recesses could be on the outer side of the parts for engaging an external pipe. The balls can move axially and radially in the recesses for accommodating local ovality and engage surfaces over an arc of circumference of the balls. The parts need not be tubular and one part could be closed off to provide an end cap for the pipe in the other to form a clamp.

11 Claims, 2 Drawing Sheets

CLAMPS AND CONNECTORS

FIELD OF THE INVENTION

This invention relates to clamps and connectors.

FEATURES AND ASPECTS OF THE INVENTION

According to this invention, a clamp or connector comprises two parts each having an axis, at least one of the parts having a plurality of inclined recesses such that each recess provides a surface inclined to the axis at an acute angle, a plurality of movable elements respectively received in the plurality of recesses and engaging the respectively inclined surfaces for engaging an elongate member, respective biassing means for the movable elements operative to bias the respective movable elements towards an axial end of the respective recess and hence along said inclined surface, and means for moving the two parts relative to each other to cause the movable elements to engage the elongate member more firmly, each movable element being movable axially and radially in the respective recess to accommodate any surface nonuniformity of the elongate member in the area of one movable element relative to the other movable elements.

Each movable element may be associated with respective spring means in the respective recess for urging the movable element radially and axially. The recesses may be bores which extend from an end surface of the respective part and intersect an axial surface, which may be an inner axial surface, and the bore may intersect the axial surface with an aperture which has a greater axial extent than circumferential extent. There may be a seal for engaging the elongate member and compressed by movement of the parts toward each other. The means for moving the parts toward each other may comprise threaded means engageable with the parts and operable to move the parts relative to each other. One or both of the parts may have the recesses and movable elements.

Each part may have a through passage for receipt of a respective elongate member, and the parts may have overlapping portions so as to be in telescopic relationship. The inclined surfaces may engage the respective movable element over an arcuate extent of the movable element, as opposed to line contact. The movable elements preferably are adapted to roll over the elongate member and respective inclined surface, and the movable elements typically may comprise spheres. The movable elements may be biased toward an axially outer end of the respective recess, and the parts may be moved toward each other.

The means for moving the parts towards each other may comprise threaded means engageable with the parts and operable to move the parts relative to each other.

Both said parts may have said recesses and movable elements.

Each part may have a through passage for receipt of a respective elongate member.

The parts may have overlapping portions so as to be in telescopic relationship.

The inclined surfaces may engage the respective movable element over an arcuate extent of the movable element.

The movable elements may be adapted to roll over the elongate member and respective inclined surface.

The movable elements may comprise spheres.

The movable elements may be biassed towards an axially outer end of the respective recess and the parts may be moved towards each other.

DESCRIPTION OF THE DRAWINGS

The invention may be performed in various ways and some specific embodiments with possible modifications will now be described by way of example with reference to the accompanying drawings, in which.

DESCRIPTION OF PREFERRED EMBODIMENTS

Figure 1:
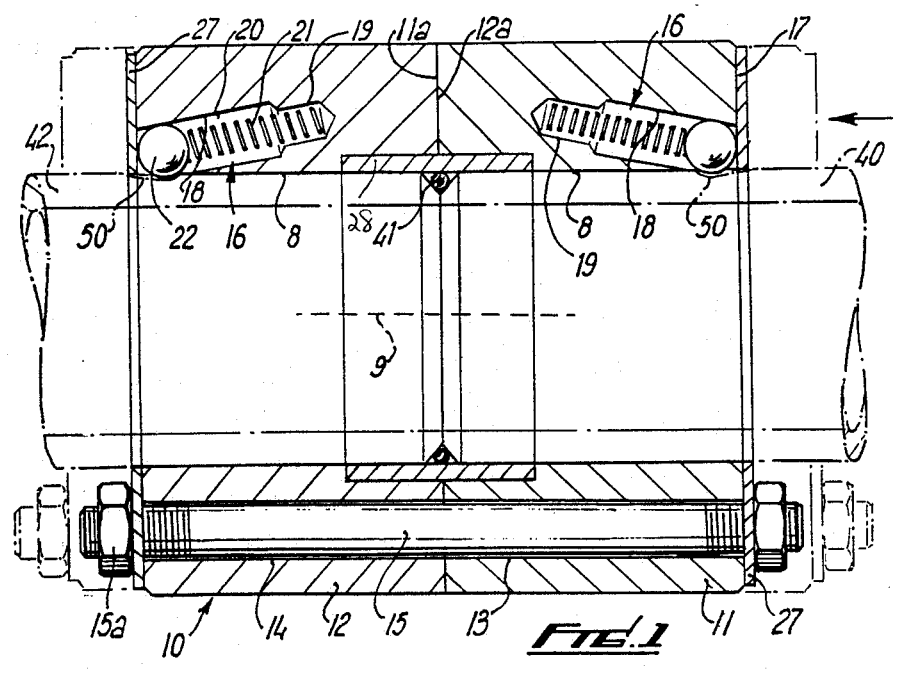
FIG. 1 is a longitudinal section through a pipe clamp or connector.
Figure 2:
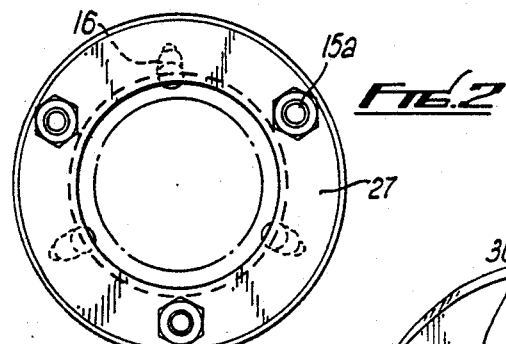
FIG. 2 is an end view in the direction of Arrow A.
Figure 3:
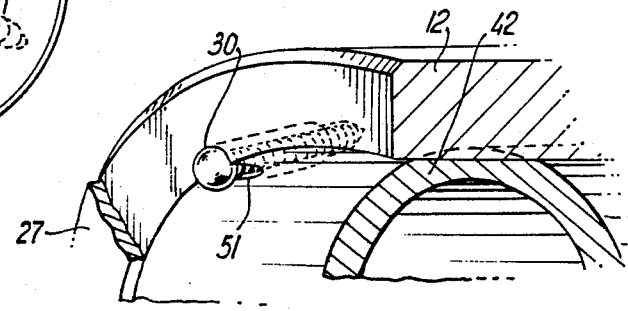
FIG. 3 is a perspective view of part of FIG. 1 with part omitted.

Referring to FIGS. 1 to 4, a clamp or connector 10 for a pipe or other elongate member comprises similar tubular parts 11, 12 having central longitudinal axes 9 and end faces 11a, 12a which in use may abut. The inner ends of the parts 11, 12 have an enlarged bore to receive an annular element 28 having an internal diameter equal to the internal diameters of the parts 11, 12. The parts 11, 12 have central bores providing faces 8. The inner end portions of parts 11, 12 may be stepped so as to overlap or be telescoped together.

The part 11 is formed with a plurality of angularly spaced bores 13 which are aligned with bores 14 in the part 12 to receive studs 15 threaded at their ends to receive nuts 15a by which the parts can be held together and drawn axially together. Instead of studs, threaded bolts could be used. The part 11 is formed with a plurality of equiangularly spaced circular cross-section bores 16, three as shown, which extend from an outer end face 17 and are inclined radially outwardly as they extend axially inwardly so as to provide an inclined or taper surface 18. The bores 16 are, as shown, stepped to have an inner smaller spring-locating portion 19 and a wider axially outer portion 20 but the bores could be of uniform cross-section. A helical spring 21 is located in the portion 19 and engages a spherical ball 22 in the portion 20. The diameters of bores 20 are essentially equal to the diameters of balls 22. The balls 22 are biased axially outwardly by their respective spring.

The outer edges 30 of the bores adjacent the end faces 17 are peened over so as to prevent the balls falling out of the bores 20. In the case where annular end washers 27 are provided the balls 22 initially engage the washers. In an initial position the balls 22 extend inwardly of surface 8 and the springs 19 are relatively light springs of sufficient strength to hold the balls initially at their axial outward position and in use in contact wth a pipe or other elongate member being gripped.

The part 12 is provided with similar bores, springs and balls. Initially the parts 11, 12 are spaced as shown in chain-dotted lines.

To make a joint or coupling, a circular section pipe 40 is inserted half-way into the coupling with the parts 11, 12 in their initial spaced apart position. A seal 41 for example of metal, which is initially annular and flat, is placed against the end of the pipe 40. The other pipe 42 is then inserted until its inner end engages the seal 41. The nuts 15a are then tightened, compressing the seal 41, to move the parts 11, 12 towards each other. When the pipe is inserted, the pipe engages the balls which roll further into the respective recess, thus moving radially outwards and axially inwards, whilst remaining in contact with the pipe surface and the surface 18. As the nuts 15a are tightened, the parts 11, 12 move towards each other and the balls 22 roll over the respective pipe surface and the reclined surface 18 and move axially outwards and radially inwards so as to swage into or deform the respective pipes as indicated at 50 increasing the grip of the balls, and the seal compression. A leakproof joint is thus provided. In the final position the faces 11a, 12a may be spaced apart or abut each other.

The balls in swaging into the pipe cold form the pipe and because the balls are rolling there is little or no tendency to displace the pipe material radially outwards which might then interfere with movement of the balls. The angle of inclination of the axes of the bores 16 to the longitudinal axis of the respective part 11, 12 may for example be bewteen 4° and 20°. As the angle of inclination is increased, an angle is reached below which the balls will roll in use and above which the balls will slide, this angle depending principally on the coefficient of friction between the balls and the pipe. A sliding condition implies a considerably greater radial force on the coupling for a given axial force applied by rotating the nuts 15a, thus requiring a more massive coupling. The angle of inclination is therefore preferably chosen to give a rolling action of the balls 22 during use; this also reduces wear on the balls.

The balls 22 extend through apertures 51 in the inner surfaces 8 of parts 11, 12, the apertures 51 having a greater axial extent than circumferential extent.

The balls 22 are free to move independently somewhat axially inwards and thus radially outwards to accommodate local nonuniformity such as ovality in the respective pipe and in use one or more balls may so move.

To release the coupling the nuts 15a are untightened allowing the parts 11, 12 to move away from each other, the coupling is then rotated to bring the recesses 50 to positions angularly spaced from the balls, and the pipe or pipes moved axially out of the coupling parts by pulling axially on either or both coupling and pipe and simultaneously executing an oscillatory rotary motion between the pipe and coupling.

In a modification, the bores 16 are on the outer surface of the parts 11, 12 and the balls engage the inner surfaces of pipes which surround the clamp or connector.

There may be a plurality of parts 11, 12 and associated springs and balls, the parts 11 having overlapped portions so as to be telescoped together and the parts 12 being similarly telescoped together and all the parts being held together by the bolts or studs 15 extending through them. Each pipe is then gripped by two or more sets of axially spaced balls. There could be two or more parts 11 in FIG. 5.

Figure 4:
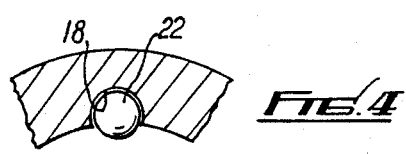
FIG. 4 is an enlarged scrap view of part of FIG. 2.

It will be seen from FIG. 4 that the surface 18 engages the associated ball 22 over an arcuate extent which may exceed 180°. This arcuate engagement resists or prevents any tendency for the balls 22 to gouge into the surfaces 18 as would occur if for example the parts 11, 12 were of the same material and the balls 22 made line contact with the surfaces 18.

Figure 5:
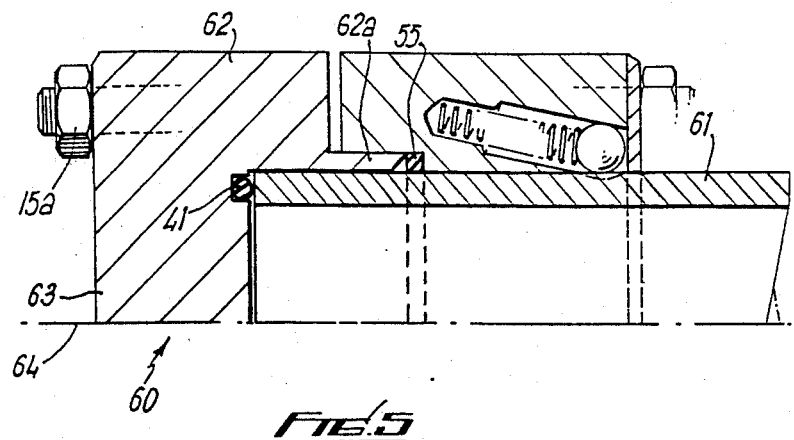
FIG. 5 is a longitudinal section through another clamp or connector.

In FIG. 5 the clamp 60 is intended as an end cap for a pipe and is adapted to receive only one pipe 61, the part 62 corresponding to part 12 in this case being closed by cross portion 63 and having element 62a integral therewith. The central axis is at 64. An annular seal 55 is engaged between the element 28 and the part 62 and engages the surface of the pipe 61, seal 41 being located in an end face of portion 63 and engaging the end of the pipe.

Figure 6:
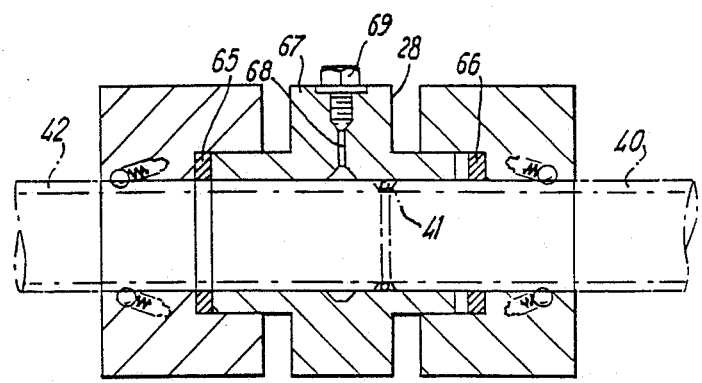
FIG. 6 is a schematic showing of another embodiment.

In FIG. 6 the arrangement is similar to FIG. 1, but with annular seals 65, 66 at the ends of element 28, seal 66 initially being spaced, as shown, from the element 28 but engaging the element when the bolts or studs 15 are tightened. In this case the elements 28 has a central radially enlarged portion 67 which has a radial bore 68 normally closed by a plug 69 but the plug 69 can be removed to connect the bore 68 with a source of gas, e.g. air, under pressure and leakage of the gas past any of seals 41, 65, 66 can be detected using suitable sensors. The pressure testing of the seals can also be applied to the other described embodiments having seals.

The clamp can be used as a lifting tool having a lifting axis and need not be annular but could be of other section.

The outer diameters of pipes 40, 42 can be less than the diameter of surfaces 8.

Figure 7:
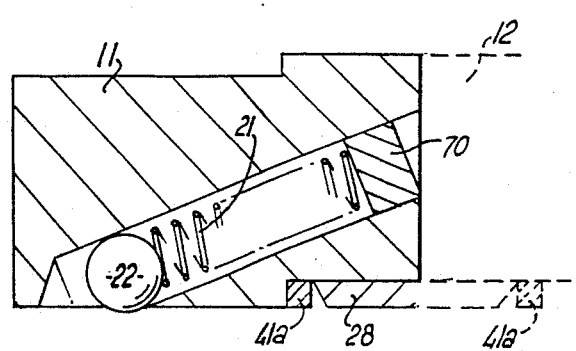
FIG. 7 shows a modification.

FIG. 7 shows a preferred construction in which the bores 16 are of uniform section and extend from the axially inner faces of parts 11, 12 to the respective surface 8, being closed at their inner ends by plugs 70. Annular seals 41a are located at the ends of element 28; these seals can be present in other embodiments.

In a modified arrangement the bores 16 extend axially outwardly and radially outwardly from faces 11a, 12a and the threaded means 15, 15a are adapted to move the parts 11, 12 apart. Thus the parts 40, 42 can be clamped and subjected to a separating force.

I claim:

1. A clamp comprising two parts each having an axis, at least one of the parts having a plurality of inclined recesses such that each recess provides a surface inclined to the axis at an acute angle, a plurality of movable elements respectively received in the plurality of recesses and engaging the respectively inclined surfaces for engaging an elongate member, respective biassing means for the movable elements operative to bias the respective movable elements towards an axial end of the respective recess and hence along said inclined surface, and means for moving the two parts relative to each other to cause the movable elements to engage th elongate member more firmly, each movable element being movable axially and radially in the respective recess to accommodate any surface nonuniformity of the elongate member in the area of one movable element relative to the other movable elements.

2. A clamp as claimed in claim 1, in which each movable element is associated with respective spring means in said respective recess for urging the movable element radially and axially.

3. A clamp as claimed in claim 1, in which the recesses are bores extending from an axial end surface of said one part and intersecting an axial surface.

4. A clamp as claimed in claim 3, in which the axial surface is an inner surface.

5. A clamp as claimed in claim 3, in which the bore intersects said axial surface with an aperture which has a greater axial extent than circumferential extent.

6. A clamp as claimed in claim 1, including a seal engageable by the elongate member and compressed by said movement of the two parts relative to each other.

7. A clamp as claimed in claim 1, in which the means for moving the parts relative to each other comprises threaded means engageable with the parts and operable to move the parts towards each other.

8. A connector as claimed in claim 1, in which both said parts have said recesses and said movable elements, and each part has a through passage for receipt of a respective elongate member.

9. A clamp as claimed in claim 1, in which the movable elements are adapted to roll over the elongate member and respective inclined surface.

10. A clamp as claimed in claim 1, in which the inclined surfaces engage the respective movable element over an arcuate extent of the movable element.

11. A clamp as claimed in claim 1, in which the movable elements are biassed towards an axially outer end of the respective recess and the parts are moved towards each other.

* * * * *

UNITED STATES PATENT AND TRADEMARK OFFICE
CERTIFICATE OF CORRECTION

PATENT NO.   : 4,822,203
DATED        : April 18, 1989
INVENTOR(S)  : OWEN WALMSLEY It is certified that error appears in the above—identified patent and that said Letters Patent is hereby corrected as shown below:

On the first page of the printed patent, the information page, the information relating to the assignee is changed as follows:

-- [73]  Assignee:  Robert Emmett, Lancaster, England
                             part interest --

Signed and Sealed this

Twenty-third Day of January, 1990

Attest:

JEFFREY M. SAMUELS

*Attesting Officer*       *Acting Commissioner of Patents and Trademarks*